United States Patent [19]
Whipple, III et al.

[11] Patent Number: 6,132,084
[45] Date of Patent: Oct. 17, 2000

[54] INFRARED NON-CONTACT TEMPERATURE MEASUREMENT FOR HOUSEHOLD APPLIANCES

[75] Inventors: Walter Whipple, III, Amsterdam, N.Y.; Robert Philbrick Alley, North Myrtle Beach, S.C.; Piero Patrone Bonissone, Schenectady, N.Y.; Mark Edward Dausch, Latham, N.Y.; Vivek Venugopal Badami, Schenectady, N.Y.

[73] Assignee: General Electric Company, Schenectady, N.Y.

[21] Appl. No.: 09/201,024

[22] Filed: Nov. 30, 1998

[51] Int. Cl.[7] .................................. G01J 5/00; H05B 6/50
[52] U.S. Cl. .......................... 374/131; 374/126; 374/128; 374/149; 219/711
[58] Field of Search ..................................... 374/131, 128, 374/126, 149, 178, 161; 219/711

[56] References Cited

U.S. PATENT DOCUMENTS

| | | | |
|---|---|---|---|
| 4,191,876 | 3/1980 | Ohkubo et al. | 374/149 |
| 4,360,723 | 11/1982 | Fukuda et al. | 374/128 |
| 4,568,201 | 2/1986 | Noda | 374/128 |
| 4,919,542 | 4/1990 | Nulman et al. | 374/126 |
| 5,241,148 | 8/1993 | Kondoh et al. | 374/149 |
| 5,271,084 | 12/1993 | Vandenabeele et al. | 374/126 |
| 5,326,173 | 7/1994 | Evans et al. | 374/126 |
| 5,501,637 | 3/1996 | Duncan et al. | 374/126 |
| 5,727,017 | 3/1998 | Maurer et al. | 374/126 |
| 5,796,081 | 8/1998 | Carlsson et al. | 374/149 |
| 5,993,059 | 11/1999 | O'Neill et al. | 374/126 |

FOREIGN PATENT DOCUMENTS 0210921  9/1986  Japan ..................................... 374/161

*Primary Examiner*—Diego Gutierrez
*Assistant Examiner*—Stanley J. Pruchnic, Jr.
*Attorney, Agent, or Firm*—Donald S. Ingraham; Douglas E. Stoner

[57] ABSTRACT

A temperature sensor system for a household appliance, such as a microwave oven, that provides for a non-contact self-calibrating measurement of the temperature of an object disposed in a chamber of the appliance. The system comprises an infrared transmitter and an infrared receiver, as well as a distribution apparatus for coupling the transmitter and receiver to the appliance chamber. A scan pattern of infrared radiation is provided for the chamber and the detected infrared radiation from the chamber is used by a processor to generate an accurate measure of the temperature of the object in the chamber.

22 Claims, 7 Drawing Sheets

INFRARED NON-CONTACT TEMPERATURE MEASUREMENT FOR HOUSEHOLD APPLIANCES

BACKGROUND OF THE INVENTION

The field of the invention is temperature measurements for household appliances and, more particularly, non-contact temperature measurement devices using infrared radiation in combination with a distribution system to accurately measure the temperature of an object disposed in the chamber of such an appliance, such as a microwave oven.

Many household appliances benefit from use of a temperature sensor (as used herein, "household appliances" refers to apparatus used for heating or cooking food, storing food, cleaning wash items, drying washed items, and the like). In such appliances, such as a refrigerator, stove, or clothes dryer, it may be desirable to know the temperature of objects disposed in chambers of the appliance (e.g., food stuffs in a refrigerator or oven; clothes material in a dryer). Temperature sensing devices, to be effective in such an appliance, must be robust and cost effective, and adapted to provide reasonably accurate measurements. Temperature measurement of objects has been the focus of particular attention in ovens for heating food items. One example is microwave ovens.

Microwave ovens use a magnetron to produce the beam of microwave energy which has high heating power. The microwave oven heats or cooks a multiplicity of substances; for example, cooking food or heating water, heating consumable and non-consumable products in or devoid of associated packaging, or even drying wet items. As used herein, the term "object" is meant to include all substances and products heated or cooked by the microwave oven. The microwave energy or beam is directed into a chamber of the microwave oven so as to intercept and enter, in many directions, the object therein, heating and cooking the object. It is desired that the temperature of the object being heated, cooked or warmed in a microwave oven be known. Microwave ovens commonly use algorithms based on time or energy levels (usually selectable from 1 to 10) selected by an operator to allow cooking of the object to its desired temperature.

Different approaches have been tried to monitor the state of the object being heated. One technique for physically measuring the temperature is to insert a temperature sensing probe into the object being heated. This approach necessitates locating the probe, cleaning it, placing it in the object being heated, and finally plugging it into the proper connector of the microwave oven. Aside from the inconvenience to the operator, another drawback of this technique is that it cannot be used for objects that are heated in containers. Another technique uses the water vapor being liberated from the object as an indication of the heated object's temperature and completion of the cooking process. Such an approach requires that the object to be heated contain sufficient moisture to be detected by the measurement system, which limits the usefulness of this approach. A further technique, such as that described in U.S. Pat. No. 4,568,201, uses infrared radiation to provide for a non-contact temperature measurement of the object being cooked and employs an infrared (IR) sensor along with a temperature sensor to control microwave oven cooking. Both of these sensors are located in the oven chamber.

It is desired that a non-contact temperature measurement of food being cooked be provided by using infrared radiation, but not be limited to employing both an infrared (IR) sensor and an independent temperature sensor, and also not be limited to having these sensors located in the chamber of the microwave oven.

Further, the use of microwave energy for heating or cooking an object in a microwave oven may result in the creation of standing waves which have maximum and minimum points spatially distributed in the oven interior. This wave distribution can cause uneven heating or uneven temperature measurement of the object exposed to the radiation. One solution for negating the effect of standing waves on cooking includes mode stirring, which cyclically disturbs the standing waves within the chamber of the microwave oven so as to more evenly distribute the microwave energy throughout the chamber and, accordingly, more evenly heat the object in the chamber of the microwave oven.

Additionally, the attenuation of the microwave radiation between the source, the object being heated, and the measurement device is beneficially considered to provide an accurate temperature measurement of the object being heated.

It is thus desirable to provide a non-contact temperature measurement system for an appliance that can provide a temperature signal calibrated for conditions of the appliance (age, level of dirt or other contamination in the chamber or on the detector, and the like). It is also desirable that the temperature measurement system for an appliance, such as a microwave oven, serve both as an infrared (IR) sensor that detects infrared radiation emanating from the object being heated and as its own temperature sensor for calibration purposes. Such a microwave oven system also desirably has the measurement circuit components located outside the chamber of the oven. It is further desired to employ mode stirring techniques in combination with infrared radiation to provide for a non-contact temperature measurement of the objects being heated or cooked in the chamber of the microwave oven. It is still further desirable to provide for an infrared non-contact temperature measurement of an object being heated or cooked in the chamber of the microwave oven that takes into account the emissivity of the object so that an accurate temperature measurement of the object may be obtained.

SUMMARY OF THE INVENTION

A temperature sensing system in accordance with the present invention provides a non-contact measurement of the temperature of the object disposed in a chamber of a household appliance.

The temperature sensing system comprises an infrared radiation source; a distribution apparatus coupled to the infrared radiation and disposed to distribute a scan pattern of transmitted infrared radiation into the chamber; an infrared radiation detector coupled to the distribution apparatus to detect infrared radiation emanating from the chamber and objects within the chamber; and a processor coupled to the infrared radiation detector, the processor being responsive to the detected infrared radiation so as to generate a calibrated temperature signal for the object disposed in the chamber.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which like characters represent like parts throughout the drawings, and in which:

DETAILED DESCRIPTION OF THE PREFERRED EMBODIMENTS

A household appliance 5 in accordance with the present invention comprises a non-contact temperature measurement system 10 for detecting the temperature of an object 106 disposed within the appliance (FIG. 1) (alternatively, multiple objects, e.g. 106 and 108 are disposed in the appliance; by way of illustration and not limitation, object 106 is used for most discussion herein). As used herein, "household appliances" generally refers to apparatus used for heating or cooking food, storing food, cleaning wash items, drying washed items, and the like (without being limited to such machines being disposed in a residential home). Examples of such appliances in which it may be desirable to know the temperature of objects disposed in chambers of the appliance include refrigerators, stoves, or clothes washers or dryers. "Non-contact", as used herein, refers to a temperature measurement system that does not require physical contact between a sensor for the system and the object for which the temperature information is sought.

Figure 1:
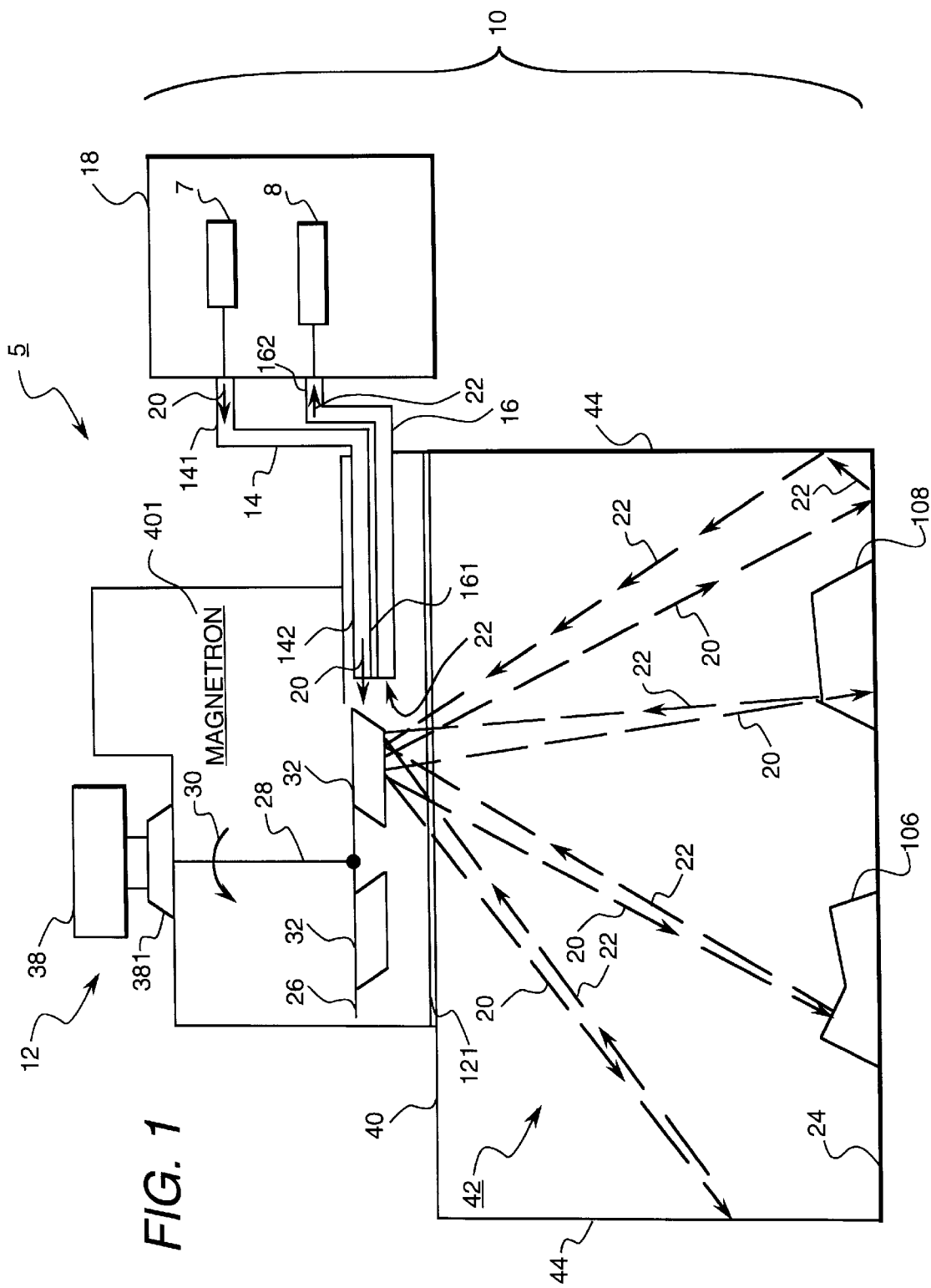
FIG. 1 is a schematic illustrating the essential features of a temperature sensing system for an appliance in accordance with one embodiment of the present invention.

By way of example and not limitation, the present invention will be described and illustrated herein in an embodiment in which appliance 5 is a microwave oven. Portions of microwave oven 5 and non-contact temperature measurement system 10 are shown in FIG. 1. The microwave oven uses a magnetron to produce beams of electromagnetic microwaves that provide heating power. The beams of microwaves are directed into a chamber 42 of the microwave oven by means of a distribution apparatus 12, so the beams intercept and enter, in multiple directions, the object being heated or cooked in the chamber of the microwave oven. The magnetron and its associated components for producing electromagnetic microwaves are known in the art.

The system 5 of FIG. 1 comprises an infrared (IR) radiation source 7, a distribution apparatus 12 for disturbing electromagnetic fields, including infrared radiation (such apparatus typically having means such as a rotating blade such as a fan or the like, a waveguide 14 having a light pipe comprised of one or more optical fibers for receiving and delivering infrared energy, a waveguide 16 having a light pipe comprised of one or more optical fibers for receiving and delivering infrared energy); and an infrared radiation detector 8. Alternatively, waveguides 14, 16 comprise internally reflecting hollow tubes that are adapted to transmission of IR. Infrared radiation source 7 and detector 8 are typically collocated in a processor 18 (with the infrared transmitting and receiving components located on a circuit board that is typically disposed external to chamber 42 of appliance 5), which processor is coupled to radiation source 7 and detector 8 so as to control operation of those components and generate an output signal representative of the temperature of an object disposed in chamber 42.

The distribution apparatus (also referred to as distribution means) 12 typically is disposed so as to provide coupling between infrared source 7 and infrared radiation detector 8, enabling passage of infrared radiation from source 7 to chamber 42 and infrared radiation emanating from chamber 42 to detector 8. The processor 18 controls transmission of infrared radiation, indicated by directional arrows 20, via the means 12 by way of optical waveguide 14 and receives infrared radiation, indicated by directional arrows 22, via the distribution means 12 by way of optical waveguide 16. The distribution apparatus enables the generation of an alternating (ac) type of IR signal that facilitates detection of a wideband signal.

By way of example and not limitation, distribution apparatus 12 for disturbing electrical fields comprises a disk 26 that is attached, by appropriate means, to a shaft 28 which is rotated in a direction indicated by directional arrows 30. The disk 26 typically comprises a slanted fin 32. The fin 32 commonly has a slanted arrangement as shown in FIG. 1, but alternatively has a scoop or funnel shape. Further, there need only be one fin 32, but generally a plurality of fins 32 are provided on the rotating disk 26. As seen in FIG. 1, the slanted fin 32 is within the line of sight of the exit portion 142 of the optical waveguide 14 which, in turn, has its entrance portion 141 in the line of sight of the transmission and reception component in processor 18. The slanted fin 32 reflects the infrared radiation 20 downward and into chamber 42.

Floor 24 of the chamber, along with the walls of the chamber and the objects being heated or cooked in the chamber, returns reflected infrared radiation 22 so as to intercept the slanted fin 32. The reflected radiation is thence directed to optical waveguide 16 which directs the reflected infrared radiation back to the infrared receiver 8. Although FIG. 1 only shows two slanted fins 32, one of which is in proximity with optical waveguide 16 and being intercepted by infrared radiation, typically other slanted fins 32 are also intercepted by infrared radiation 22 as disk 26 rotates. If desired, the optical waveguides 14 and 16 may be located above (as viewed in FIG. 1) the disk 26 and the slanted fin 32 placed on the topside (to be further described with reference to FIG. 3) of the disk 26 so as to operatively cooperate with optical waveguides 14 and 16.

Distribution apparatus 12 further comprises an excitable motor 38 having the shaft 28 that is rotated at a relatively slow speed, e.g., 1–500 rpm, and typically within a range of 10 to 30 rpm, and has a motor support 381 for mounting portions of the distribution apparatus 12 onto the frame 40 of microwave oven 5. FIG. 1 illustrates a magnetron 401 and its associated components being proximately located to distribution means 12 which acts as a mode-stirrer. The distribution apparatus 12 distributes the high heating power produced by the magnetron 401 into the chamber 42 of the microwave oven.

In one embodiment the distribution apparatus 12 comprises a plastic cover, generally illustrated as reference number 121, that is placed under the disk 26 for directing microwave energy and which is transparent (or alternatively, at least translucent) to infrared radiation, as well as to microwave radiation, and also typically serves as a lens (e.g., a molded plastic piece for focusing infrared radiation energy) to provide a scan pattern of infrared radiation to (and from) chamber 42. The scan pattern of infrared radiation provides a focus profile of radiation in chamber 42, that is, the scan pattern provides a field of view that encompasses the total interior of the chamber 42. The plastic cover 121 is appropriately mounted so as not to be affected by air movement or disk vibration created by means 12 for disturbing electric fields.

FIG. 1 illustrates the transmitted infrared radiation 20 as being carried by the optical waveguide 14, and also the reflected infrared radiation 22 as being carried by the optical waveguide 16. Commonly the optical waveguides 14 and 16 are combined into one waveguide with the appropriate optical fibers thereof arranged to deliver the infrared radiation 20 and to receive the infrared reflected radiation 22 and, alternatively, appropriate on-off control of the transmitting and receiving devices associated with the infrared measuring system may be provided so that a single fiber forms one single optical waveguide for a bidirectional communication path between the composite unit 18 and the microwave chamber 42.

Figure 2:
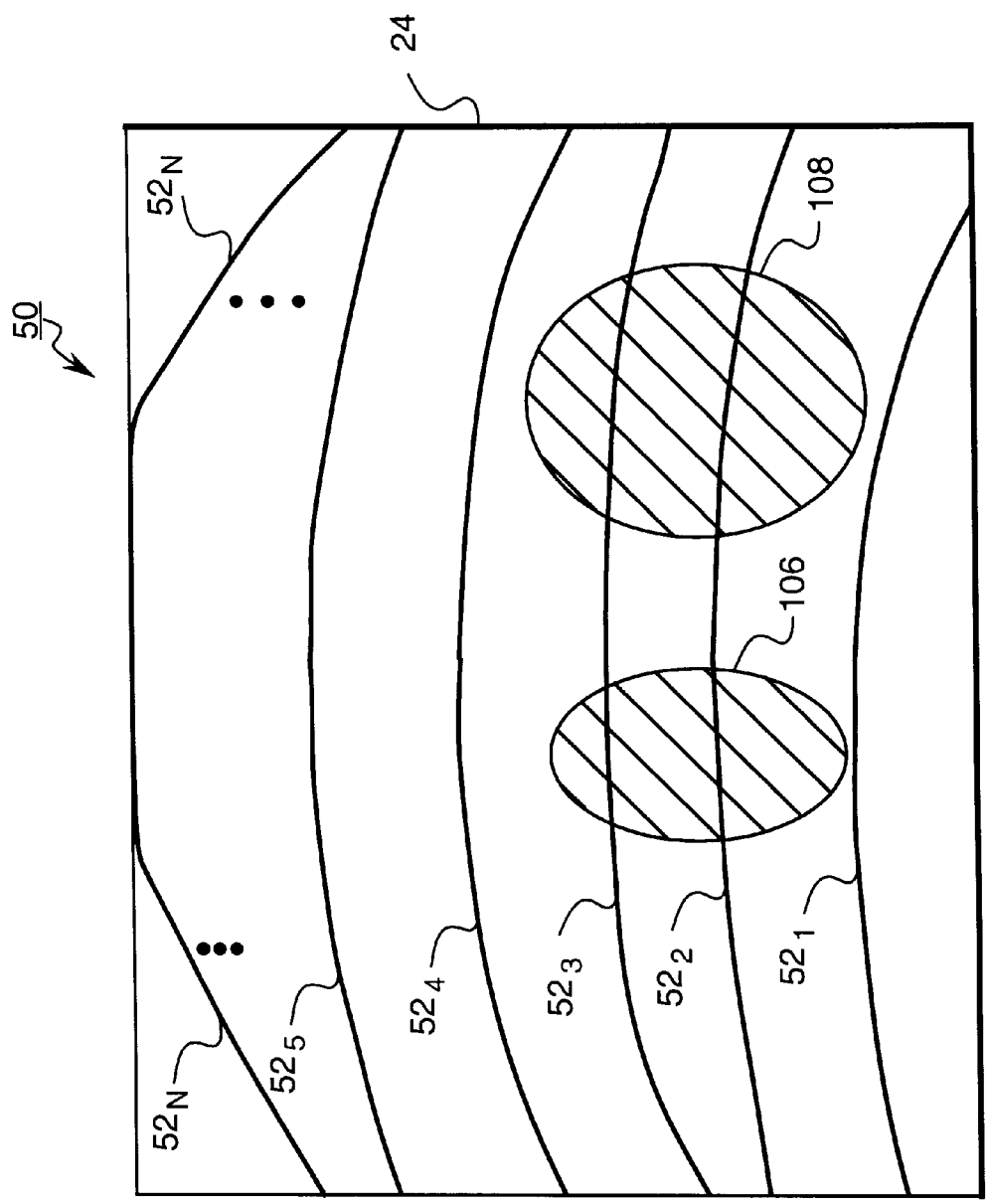
FIG. 2 illustrates floor sweep patterns created by the mode-stirrer of FIG. 1.

Distribution apparatus 12 disturbs the microwave energy fields in the chamber 42 with the rotation of disk 26. The disturbance allows for even heating of the object 106 being heated or cooked in the oven. More particularly, distribution means 12 creates a so called "mode stirring" effect which is accomplished by the disk 26 being rotated at a slow speed so as to deflect energy throughout chamber 42. For the measurement techniques related to the present invention, rotating disk 26 presents a mirror to the electromagnetic fields established by the infrared radiation. More particularly, the incoming infrared radiation from infrared source (or transmitter) 7 strikes the slanted fin 32, which acts as a mirror directing and aiming the infrared radiation downward and creating a scanning effect across the floor 24 in correspondence movement of with the rotating disk 26 carrying the fin 32. This scanning effect arising out of the mode stirring is shown in FIG. 2 and encompasses the regions defined by the walls 44, the floor 24 and the object 106 being heated or cooked. In one embodiment of the present invention, disk 26 comprises metal which reflects infrared radiation, and because the disk 26 moves relatively slowly (e.g., less than about 50 rpm), the reflection from the disk 26 scans the chamber 42 causing the transmitted infrared radiation from radiation source 7 to impinge on all areas of chamber 42 (e.g., chamber walls 44 and 24, and object 106 disposed within chamber 42. As the disk 26 rotates and creates scanning lines, $52_1 \ldots 52_N$ (shown in FIG. 2) along the floor 24, the rotating disk 26 also reflects or focuses the radiation reflected from the interior of chamber 42 (e.g., walls 44, 24 and object 106). Scanning speed is determined by, among other things, the computing capacity of processor 18 to process the received energy to determine temperatures in the chamber as described herein.

The reflected infrared radiation is passed back via distribution means 12 (e.g., through the focusing lens of plastic cover 121 and via waveguide 16) and onto the sensing element of the radiation detector 8. The relatively slow moving disk 26 essentially allows the same (time wise) radiation rays that were emitted from infrared radiation source 7 in processor 18 to be returned to radiation detector 8 in processor 18 after they have been reflected off of the elements (44, 24 and 46) in the chamber 42. This transmission and reflection occur within a specified time duration to be discussed with reference to FIG. 7. The scan pattern provided by distribution apparatus 12 allows the sensing element of radiation detector 8 to pick-up infrared radiation emanating from the scanned area in chamber 42. Use of the transmitted infrared radiation further enables generation of calibrated temperature signal for the object 106 disposed in the chamber. "Calibrated signal" and the like refers to the ability of temperature sensing system 10 of the present invention to make use of the reflections of the transmitted infrared radiation pulses to account for current conditions of the system 10 and the appliance 5 (e.g., aging of sensors, drift in the electronic processing components, or contamination within the chamber that may affect the level of infrared radiation emanating from the chamber). The system thus not only detects, from detection of the infrared radiation emanating from chamber 42, a maximum signal that can be used to generate a temperature value for the object 106 in the chamber, but also calibrates this signal by correlation of the detected reflections of the scan pattern of the transmitted radiation (from other areas of the chamber) so that the generated temperature signal accurately reflects the actual temperature of the object in the chamber.

Optical waveguides 14 and 16 serve as light pipes; coupling the infrared radiation to chamber 42 in this manner enables the radiation source 7 and radiation detector 8 to be located away from chamber 42. Separation of the infrared radiation transmitter and detector from the chamber 42 is advantageous as it leaves space free in chamber 42 (e.g., space for objects to be cooked and the like) and keeps temperature measurement system components away from the potentially more hostile environment (e.g., radiation, dirt contamination, and the like) of the chamber. This placement arrangement also reduces the number of components (electrical leads, connectors, and the like) that must be used, increasing robustness and reliability, and reducing the complexity and cost of the temperature sensing system 10.

Figure 3:
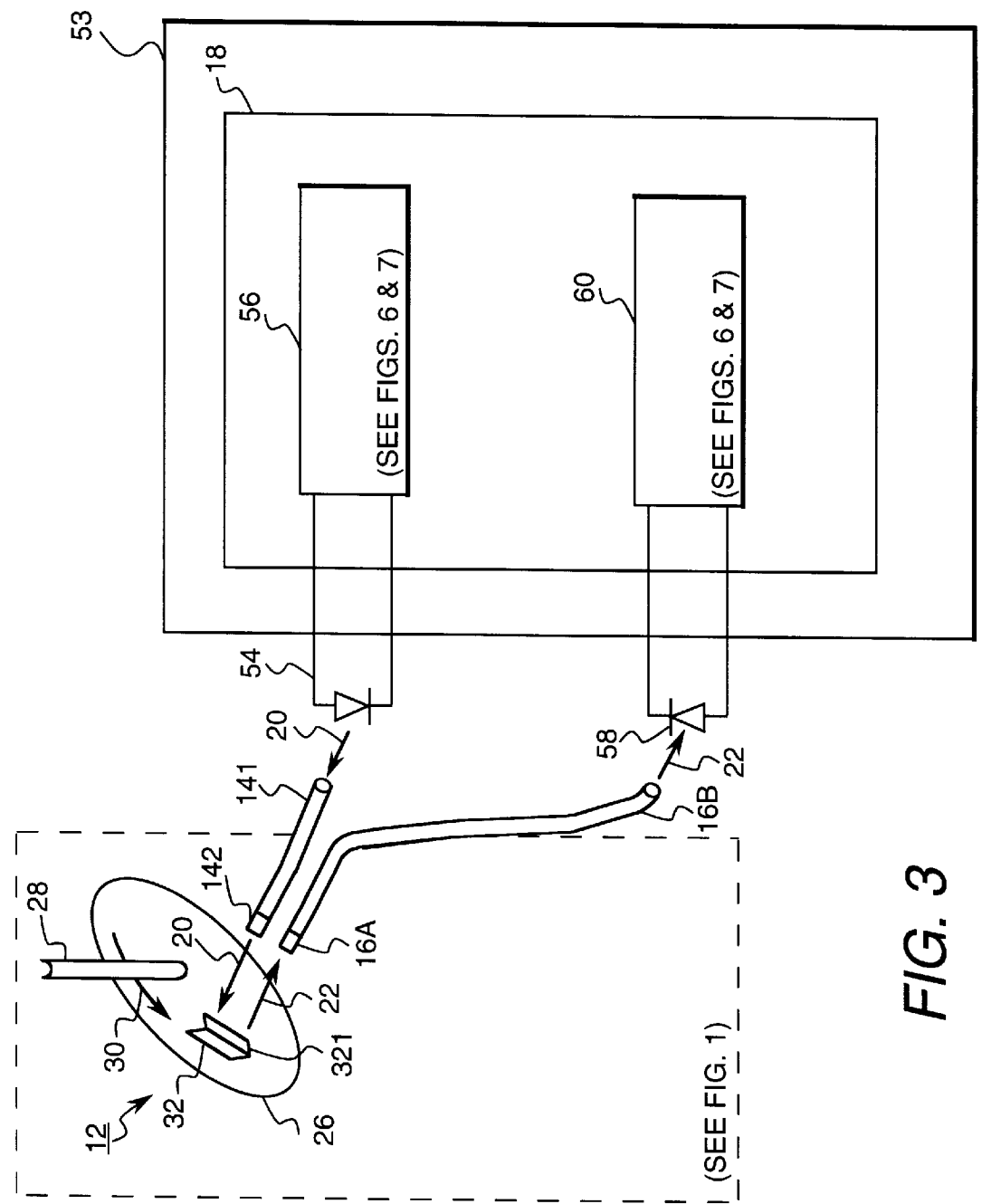
FIG. 3 illustrates an arrangement of the infrared transmitter and infrared receiver for one embodiment of the present invention.
Figure 4:
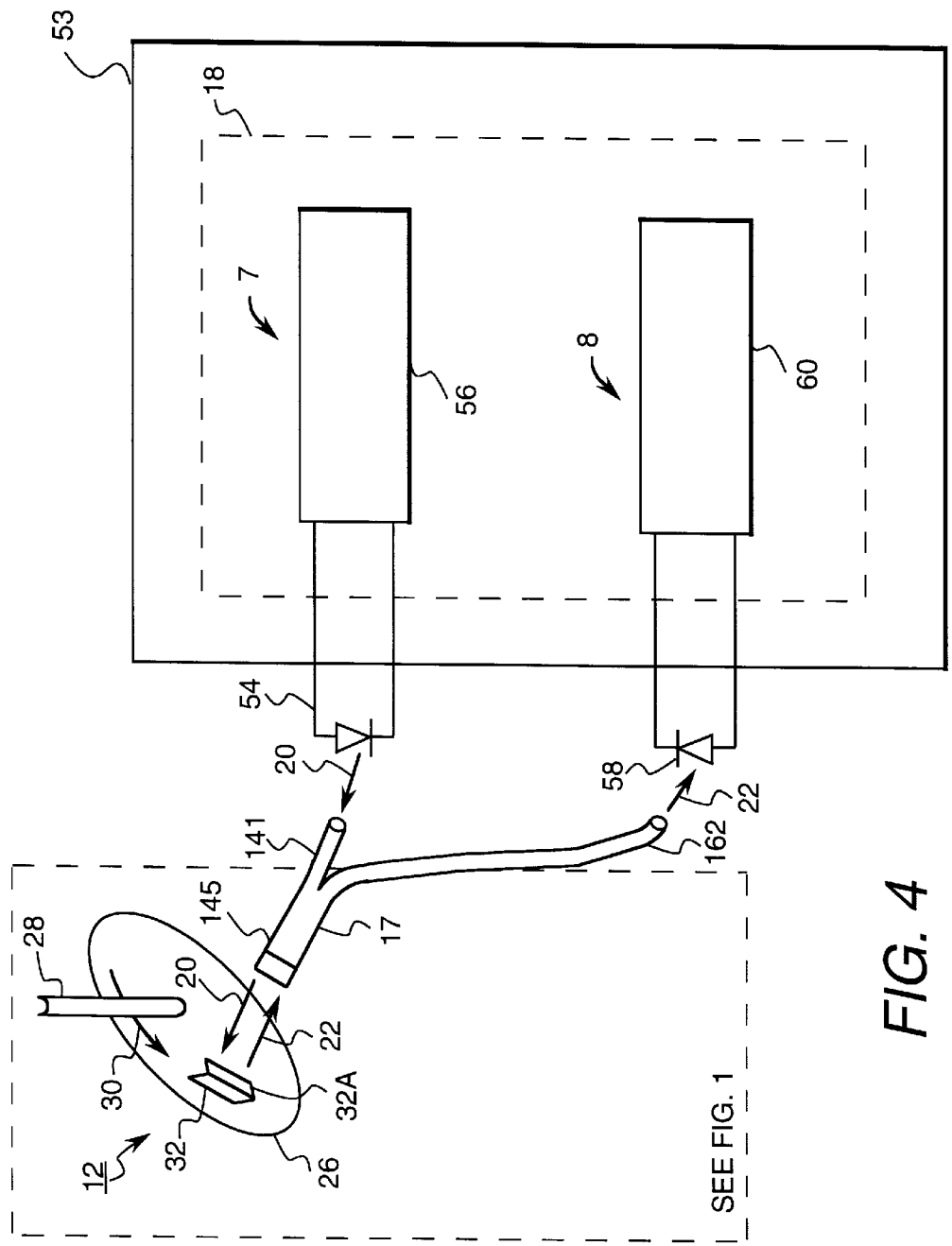
FIG. 4 illustrates an arrangement of the infrared transmitter and infrared receiver for a further embodiment of the present invention.
Figure 5:
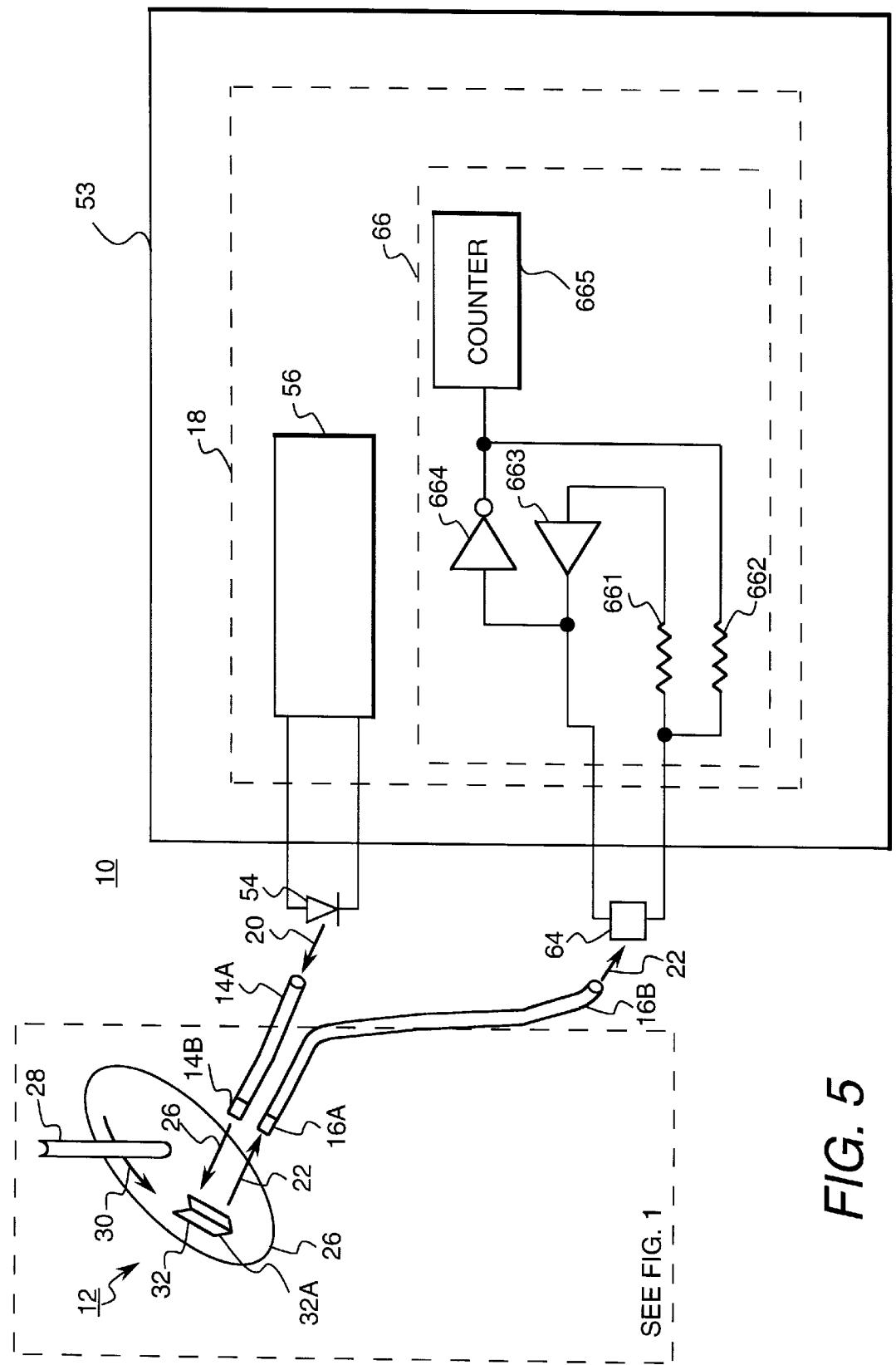
FIG. 5 illustrates an arrangement of the infrared transmitter and another infrared receiver associated with another embodiment of the present invention.

The arrangement of of temperature sensing system 10 as illustrated in FIGS. 3, 4, and 5 has the benefit of having optical paths (e.g., waveguides 14 and 16 that are part of distribution apparatus 12) with known lengths and other known characteristics so as to enable reasonably accurate predication of attenuation encountered by the radiation traveling through distribution apparatus 12.

In an alternative embodiment, temperature monitoring system 10 comprises a common optical path, that is, an optical waveguide that combines the optical waveguides 14 and 16, to send and return infrared radiation to and from processor 18. One advantage of such an arrangement is a reduction in parts, providing a savings in cost and a more easily-alignable light pipe. For such a dual path, the attenuation encountered by the infrared radiation traveling to the chamber 42 is essentially the same as the attenuation encountered by the infrared radiation traveling back from the chamber 42 to the sensor. Accordingly, the overall attenuation of the infrared radiation to be taken into account is double that of one path-length of the system which simplifies and makes more accurate the determination of the temperature of the object 106 being measured. Further, as to be further described with reference to FIG. 7, since the emissivity and the reflectivity of the object 106 being heated have an inverse relationship relative to each other, the signal returned (reflected) from the object 106 is proportional to the inverse of the emissivity of the object. This relationship further simplifies the techniques for measuring the temperature of the object 106. The transmitting and receiving circuits serving as the infrared transmitter and infrared sensors of FIGS. 3, 4 and 5 may be further described with reference to FIG. 6.

The mode stirring of the infrared radiation provided by the present invention may be further described with reference to FIG. 2 which illustrates scan patterns 50 that sweep the interior of chamber 42. These scan patterns are generated by the mode-stirrer 12. As seen in FIG. 2, the scan patterns 50, appearing across the floor 24 of the chamber 42 of the microwave oven, comprise a plurality of scanning lines $52_1$, $52_2$, $52_3$, $52_4$, $52_5$ ... $52_N$, wherein the empty chamber 42 maximum and minimum IR readings by composite unit 18 are relatively constant, especially when compared to the maximum and minimum points of the standard scanning pattern with object 106, 108 in the chamber 42, as shown in FIG. 1. The representation if FIG. 2 illustrates the IR pulses that are projected by respective fins 32 of the moving distribution apparatus into chamber 42 so as to be incident on the interior of the chamber and objects disposed in the chamber. The number of scanning lines $52_1$ ... $52_N$ is dependent on the number of slanted fins 32 and the shape thereof; the width of the lines representing the degree of focus of the IR energy that is projected into the chamber. As used herein, the scanning lines $52_1$ ... $52_N$ are representative of the temperature of chamber 42, including any object 106 disposed within the chamber. The relatively uniform distribution of scanning lines $52_1$ ... $52_N$ allows for a better definition of (shape or size) and non-contact temperature measurement of the object 106 being heated or cooked in the chamber 42 (the surfaces of the chamber will have a known emissivity with the exception of contaminant on those surfaces).

One embodiment of processor 18 comprising an infrared source 7 and infrared detector 8 mounted on a circuit board 53 is illustrated in FIG. 3. FIG. 3 further illustrates an embodiment of a fin 32 that it is located on the topside of disk 26 and has an opening 321 for directing infrared radiation into scan patterns into and out of the chamber 42 (not shown in FIG. 3).

Processor 18 of FIG. 3 comprises a light emitting calibration diode 54 serving as an infrared radiation source 7 (the diode is referred to as the calibration diode because of its use in the temperature sensing circuit). Calibration diode 54 is energized by a logic circuit 56 responsive to a first signal, all to be further described with reference to FIGS. 6 and 7. The composite device 18 further comprises a detector diode 58, serving as an infrared (IR) radiation detector and a temperature sensor, that is energized and controlled (e.g., measured, amplified, and signal detected) by a logic circuit 60 responsive to a second signal, all to be further described with reference to FIGS. 6 and 7 (diode 58 is referred to as the detector diode by reason of its use in the temperature sensing circuit). The detector diode 58 is typically a semiconductor comprised of a photovoltaic material having a property of generating electrical energy, such as a current, when exposed to light, such as infrared radiation. The sensor diode 58 is adapted to serve as both a self-temperature sensor (that is, sensing the ambient temperature around the diode in the environment of processor 18) and as a sensor for the infrared radiation emanating from chamber 42 (and of objects in the chamber). Diodes comprise silicon, germanium, or the like; the specific sensitivity of the device and range of wavelengths to which it is responsive (along with necessary amplification requirements for signal generated (or alternatively, modulated) by the sensor) are selected in the design process.

The light emitting calibration diode 54 is responsive to a first signal and transmits infrared radiation, generally illustrated by directional arrows 20. The light emitting calibration diode 54 is optically coupled to entrance portion 141 of the optical waveguide 14. Similarly, receive diode 58 is optically coupled with the exit portion 162 of the optical waveguide 16.

A further embodiment of the present invention as shown in FIG. 4 is similar to the embodiment illustrated in FIG. 3 with the exception that the waveguides 14 and 16 are merged into one composite waveguide 17. Composite waveguide 17 includes a combined optical coupling point 145 to chamber 42, while retaining separate couplings (141 and 162) to radiation source 7 and radiation detector 8, respectively.

An alternative temperature sensing system is illustrated in FIG. 5, in which appliance temperature sensing system comprises an infrared sensor 64 that operates in conjunction with a temperature measurement means 66. The infrared sensor 64 typically comprises polyvinyl difluoride (PVDF) which possesses the characteristics of a piezoelectric ceramic. Alternatively, temperature sensors can comprise semiconducting bolometers and temperature sensing resistors. Temperature measurement means 66 serves as an oscillator and is comprised of resistors 661 and 662, logic elements 663 and 664 a counter 665 that receives a square-wave from element 664. The resistors 661, 662 are electrically coupled together with logic elements 663, 664 and counter 665 as shown to provide an oscillator, the frequency of which is determined by the infrared radiation detected by sensor 64 and the ambient temperature.

In operation, the infrared sensor 64 changes its capacitance when exposed to infrared (IR) energy. The capacitance change of the infrared sensor 64 causes the temperature measurement means 66 to produce a varying frequency output, corresponding to the IR flux detected by IR sensor 64 (the flux corresponding, for example, to the incidence of IR energy emanating from the chamber of the appliance in correspondence with the scan pattern provided by distribution apparatus 12). The detected IR radiation typically varies with as the scan pattern covers the chamber interior and any objects within the chamber. The frequency output of the temperature sensing means 66 is dependent on the ambient temperature and the flux of detected infrared radiation. Correlation of ambient temperature and detected IR radiation from the appliance chamber (and especially any objects in the chamber) provides for the generation of a temperature signal that represents the actual temperature of the object in the chamber.

Ambient temperature is determinable with calibration diode 54. The voltage drop across the calibration diode 54, when the diode generates the transmitted IR pulse that is coupled to the appliance chamber, decreases as ambient temperature increases, and this temperature-voltage correlation is used to generate an ambient temperature signal, which, given the physical proximity of calibration diode 54 and IR sensor 64 on composite board 18, is representative of ambient conditions for both these components.

This ambient temperature measurement commonly is also used to determine the infrared energy output of diode 54 as the infrared energy output is reduced as its temperature increases and this reduction is taken into account to determine the actual infrared energy output of diode 54. The correlation of the output frequency of temperature measurement means 66 and the voltage drop across calibration diode 54 is performed in processor 18 with a microprocessor, application specific integrated circuit, or the like, as described below so that processor 18 generates an output temperature signal representative of the true temperature of the object 106 disposed within the appliance chamber 42. "True temperature" refers to the temperature of the object (regardless of ambient temperatures) in the appliance chamber as represented on a normal scale, such as degrees Fahrenheit or degrees Celsius and the like.

Figure 6:
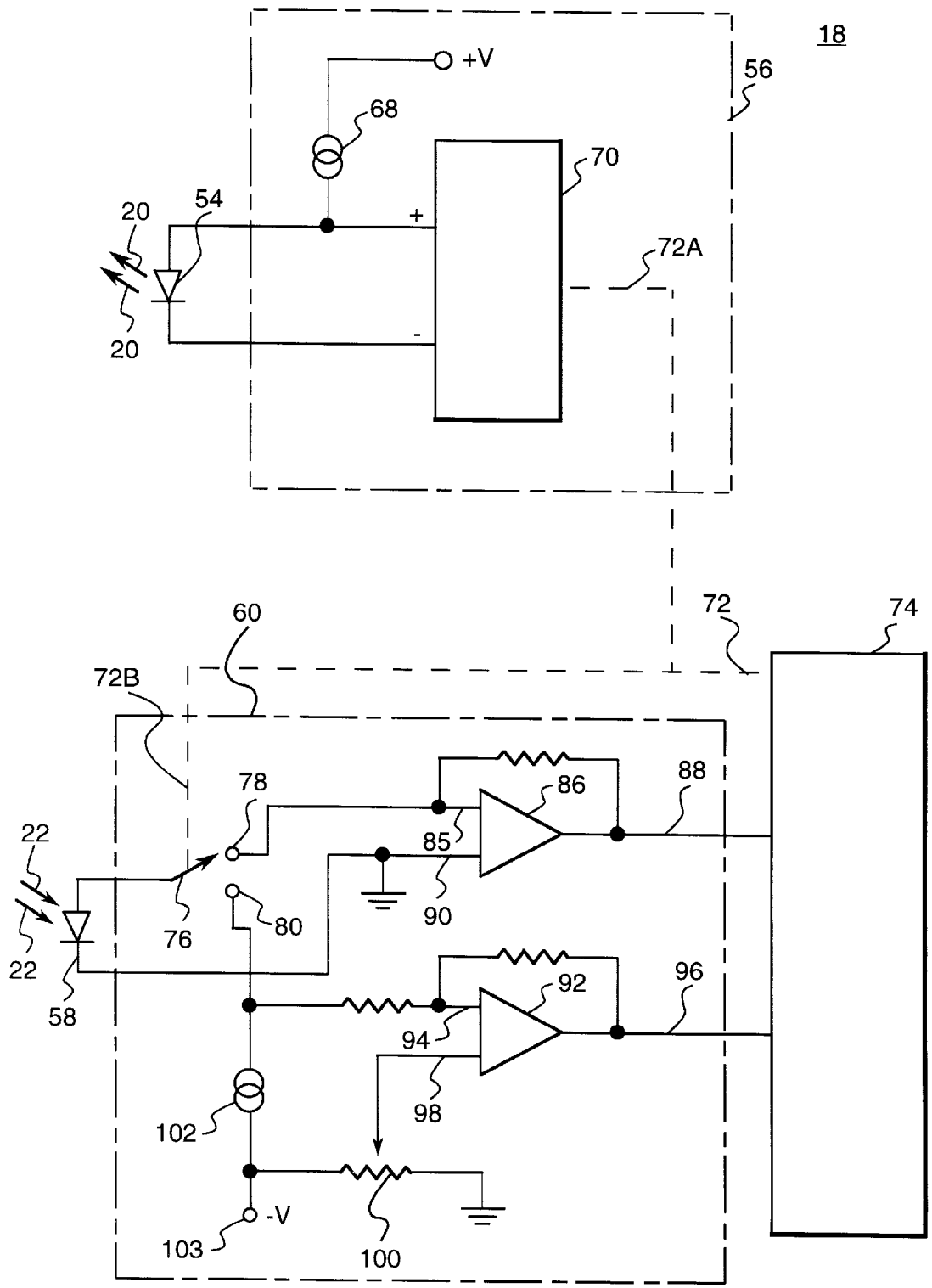
FIG. 6 illustrates the logic associated with the embodiments of FIGS. 3, 4 and 5.

One example of an ambient temperature compensation circuit for temperature sensing system 10 is illustrated in FIG. 6. In this arrangement, a switch 76 is coupled to infrared sensor diode 58 such that, when switch 76 is placed in a position 80, the IR sensor diode 58 operates as an ambient temperature sensor and when switch 76 is placed in a position 78 the diode 58 operates as an IR sensor.

FIG. 6 illustrates a further embodiment of the temperature sensing system of the present invention in which the light emitting diode 54 controlled by a transmitter circuit 56. FIG. 6 further illustrates the IR sensor diode 58 controlled by the receiver circuit 60. The circuit illustrated in FIG. 6 does not include the ambient sensor 64, the operation of which was discussed above with respect to FIG. 5. The transmitter circuit 56 comprises a current source 68 and a logic element 70 responsive to a first control signal 72A on signal path 72. The first control signal 72A is generated by a control device 74 in processor 18 and that controls (turns on and off) transmitter circuit 56, and receiver circuit 60, in accordance with the needs to respond to operator commands. A microprocessor control device 74 is coupled to receiver circuit 60. The logic element 70 further comprises an oscillator and electronic switches that are interconnected, in a manner known in the art, to cause calibration diode 54 to produce a train of infrared radiation pulses 20 as described below.

In operation, the control device 74 generates first control signal 72A to which logic element 70 and the current source 68 are responsive. Logic element 70 controls calibration diode through the application of respective positive and grounded polarities that are placed across the light emitting calibration diode 54; when diode 54 is placed in its forward-biased condition it generates the infrared radiation calibration signal (or pulse), indicated by directional arrows 20. Infrared calibration pulse 20 is delivered to the appliance chamber 42 via distribution apparatus 12 so as to provide transmitted IR radiation for the scan pattern of the interior of appliance chamber 42.

Receiver circuit 60 comprises switch 76 that typically comprises an electronic switch that has its common connection coupled to the cathode of IR sensor diode 58. Switch 76 is further coupled to control device 74 and responsive to a second control signal 72B generated by the control device 74, which signal 72B governs whether the switch is in a first position 78 or a second position 80. The first position 78 is connected to a first input 85 of a first amplifier 86. The first amplifier 86 is an inverting current amplifier. A feedback resistor connected between the first input 85 and the output terminal 88 of the first amplifier 86 determines the output voltage at output terminal 88 which is proportional to the infrared energy (previously mentioned) received by the IR sensor diode 58. The first amplifier 86 also has a second input 90 referenced to ground. The receiver circuit 60 further comprises a second amplifier 92 having resistors arranged across its first input 94 and its output terminal 96 in a manner as described for the first amplifier 86.

When switch 76 is selected to be in second position 80, the cathode of IR sensor diode 58 is connected, via a resistor, to the first input 94 of the second amplifier 92 and to current source 102. Current source 102 is further connected to a negative voltage source 103. The second amplifier 92 has a second input 98 which is connected to an adjustable reference source 100 which, in turn, has one of its ends connected to negative voltage (−V) source 103. The gain and offset change in correspondence with the temperature-induced voltage change across diode 58. The desired output of amplifier 92 provides an indication within the normal ambient temperature operating range of the appliance, typically between about 40 and 150 degrees Fahrenheit.

In operation, switch 76 is typically first placed to its second position 80. In its second position 80, the IR sensor diode 58 (not receiving an IR radiation 22) is in its forward bias condition and applies a signal to the second amplifier 92 which has its second input 98 connected to a reference source 100 so as to produce an output 96 representative of the difference between its inputs. The voltage source 100 is adjusted so that the output of the second amplifier provides a voltage that is proportional to the temperature of the diode 58. This proportional voltage representative for the ambient temperature around IR sensor diode 58 provides a basis for adjusting the temperature signal output of temperature sensing system 10 so that it accurately represents only the actual temperature of the object 106 disposed in appliance chamber 42.

When switch 76 is placed to its first position 78, IR sensor diode 58 is placed in its reversed bias condition and receives the reflected infrared radiation 22 emanating from chamber 42 (and object 106 disposed therein). The reading indicative of the temperature of object 106 is obtained by compensating the signal generated by IR transmitter source 54 and IR receiver sensor 58 when detecting IR radiation with the ambient temperature signal.

Figure 7A:
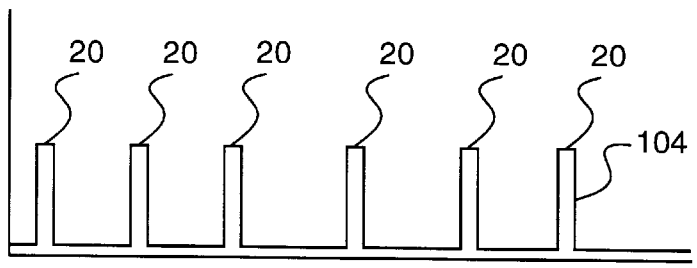
FIGS. 7A, 7B, 7C, and 7D cumulatively illustrate the operation of the system 10.

The output of calibration diode 54 typically comprises a train of IR pulses 20, each having a predetermined amplitude 104, as illustrated in FIG. 7A. The train of pulses 20 are directed, via the light pipe 14 and the rotating disk 26, to create the scanning pattern (represented in FIG. 3 as scanning lines $52_1 \ldots 52_N$) across chamber 42.

Figure 7B:
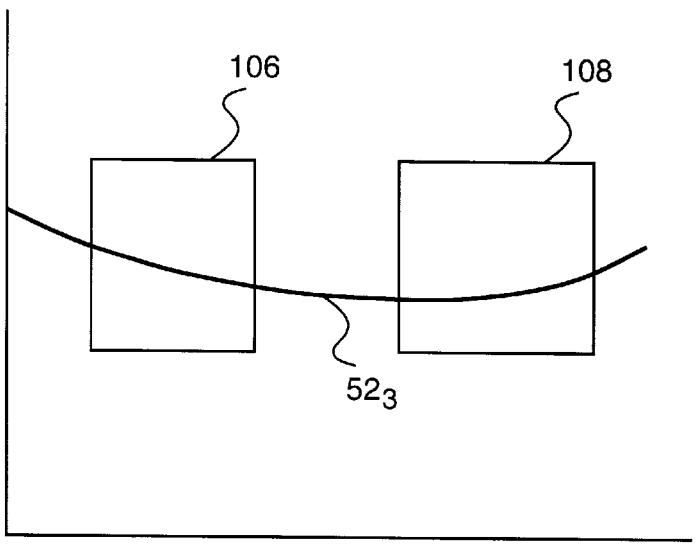

FIG. 7B further shows a representative scan line $52_3$, (part of the scan pattern previously described with reference to FIG. 2) with respect to the floor of chamber 42. By way of illustration and not limitation, two objects are shown disposed in chamber 42—a light object 106 and a dark object 108 ("light" and "dark" as used herein are used in reference to the IR spectrum). The emissivity of the objects 106 and 108, that is the amount of radiation emitted by the objects 106 and 108, is inversely proportional to the reflectivity of the objects 106 and 108, that is the amount of radiation reflected from the objects 106 and 108. This inverse relationship between reflectivity and emissivity is relatively constant, especially for low power emitters, such as the light emitting calibration diode 54 that generates infrared radiation having little heating effect on the area encompassed by the scanning lines $52_1 \ldots 52_N$. The emissivity of the walls and floor of the chamber 42 of the microwave oven are known, or may be determined in a manner yielded by the present invention.

The calibration phase refers to the method of identifying repeating patterns in the signal from the IR receiver. From the repeating patterns, features such as similar amplitude levels of the received signal are identified and sorted for future reference. During each operation of the appliance, the controller software detects the repeating patterns, extracts the appropriate features, compares the detected features to the stored features to determine a reference profile pattern, and compares the remaining signal to the reference. Once the cooking operation completes, processor 18 is typically configured to update the stored reference by performing a weighted average with the new reference and the previous reference. This updating further enables the appliance temperature measurement system to adjust for changes arising from aging of components (and consequent change in performance patterns) within the system accounts for aging of components.

In operation, the appliance temperature measurement system 10 first generates an ambient temperature compensation signal by placing switch 76 in position 80 yielding the compensation temperature signal for IR transmitter source 54 and IR receiver sensor diode 58 in a manner as previously discussed with reference to FIG. 6. The switch 76 is then placed into its first position 78 and the calibration diode 54 is rendered conductive so as to provide the infrared radiation to generate, in conjunction with distribution apparatus 12, the scan pattern for chamber 42.

Figure 7C:
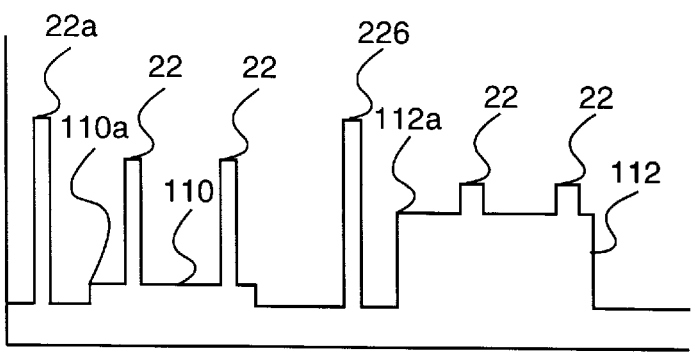

A graphical depiction of detection of infrared radiation waveforms emanating from chamber 42 is illustrated in FIG. 7C. For purposes of illustration and not limitation, the levels of detected IR radiation correspond to the example scan line $52_3$ and the objects 106 and 108 shown in FIG. 7B. The infrared radiation reflected back from the walls and floor of the chamber of the microwave oven occurs at the beginning (see pulse 22a of FIG. 7C) and middle (see pulse 22b of FIG. 7C) of each scan cycle, and is representative of the emissivity of the walls and floor of the microwave oven and such emissivity is taken into account with regard to the temperature measurements. These pulses 22a and 22b supply enough information to calibrate all of the emissivity parameters of chamber 42 and optical system losses. Other scan lines, as shown in FIG. 2, are typically also used in the calibration process. Commonly there is little change over time in the optical characteristics of the interior surfaces of chamber 42 (most such surfaces being made of durable and easily cleanable material). The interior surfaces of chamber 42 (in a microwave oven) are typically cooled by air flow from the cooling fan for the magnetron (e.g., air drawn from the ambient environment, directed across the electronics and magnetron, and thence into chamber 42 and exhausted). This cooling air flow typically keeps the chamber walls near ambient temperature (e.g., within a few degrees). Detected hot spots typically correspond to the presence of objects 106, 108, disposed in the chamber and which block the IR sensor's reception of reading from the chamber surfaces. In a further embodiment, temperature calibration can further be applied based on a lookup table of time the oven has been heating, or use of signals from a temperature sensor monitoring exhaust air temperature (which exhaust air can be directed over the control circuit to facilitate temperature sensing).

Further, periodic measurements of the temperature of the transmitter calibration diode 54 and receiver diode 58 (both previously discussed) can be made between scans (before the occurrence of pulses 22a and 22b) leaving only the temperature of the object in the chamber as the only remaining unknown. Using the wall and the floor emissivity as a calibration standard, the actual measurement of the temperature of the objects being heated may be determined.

The waveforms illustrated in FIG. 7C represent the detected IR signal generated by IR sensor 58 at the output terminal 88 of amplifier 86 of FIG. 6 when switch 76 in its first position 78. FIG. 7C shows this output as comprised of a plurality of received infrared pulses 22 that are superimposed on waveforms 110 and 112 which respectively correspond to the emissivity of the objects 106 and 108 whose temperatures are being measured. A comparison between the waveforms 110 and 112 of FIG. 7C with the baseline of the infrared reflected pulses 22 provides information on the temperature of objects in the chamber. Excursion 110a and 112a of waveforms 110 and 112 respectively represent the detection of IR radiation emanating from objects 106 and 108 respectively. The presence and nature of the objects in the chamber is also evidenced by detected pulse returns 22 riding on the waveforms 110 and 112, wherein the pulses 22 on waveform 110 have a higher amplitude than those pulses 22 on waveform 112. These comparisons are to be expected because the waveform 110 is representative of a light object and the waveform 112 is representative of a dark object, wherein the dark object 108 has a higher emissivity relative to the lower emissivity of the light object 106 which, in turn, is representative by the larger excursions from the predetermined amplitude of the pulses.

Figure 7D:
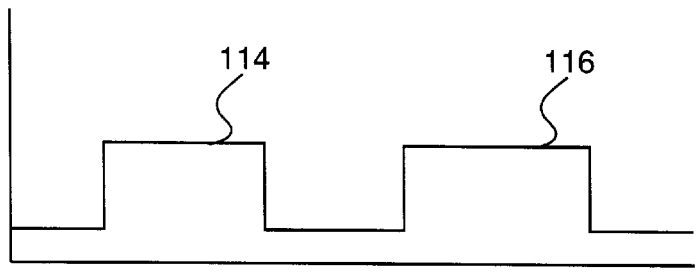

The time duration of the detection of the emissivity information is shown in FIG. 7D. FIG. 7D shows two waveforms 114 and 116 each of which corresponds to the same duration as waveforms 110 and 112 of FIG. 7C respectively. More particularly, in operation, when the switch 76 is placed to its first position 78, the first amplifier 86 detects the presence and absence of the infrared radiation 22 which, in turn, is shown by the presence and absence of waveforms 114 and 116. The output of amplifier 88 represents all of the information illustrated in FIG. 7C; the processor is configured to distinguish between the radiation from the objects in the chamber and the IR generated by the temperature measurement system. More particularly, the first amplifier 86 responds to the infrared radiation reflected from objects 106 and 108 and to the infrared radiation reflected from the floor and walls of the chamber 42. The examination of information contained in excursions 110 and 112 (temperature of the objects 106 and 108) appearing during time durations 114 and 116, respectively, takes into account the calibration information contained in pulses 22a and 22b as well as the measuring of the temperature of the diodes 54 and 58 themselves, provides for the non-contact determination of the temperature of the object 106 being heated or cooked in the microwave chamber 42.

It should now be appreciated that the practice of the present invention provides for non-contact temperature measurements of objects being disposed in a chamber of an appliance with means of transmitted infrared radiation in a scan pattern and detection of radiation emanating from the in a manner so as to provide for an accurate temperature measurement thereof. The temperature sensing system is adaptable in a wide variety of household appliances, although most commonly employed in devices where temperature measurement is essential (such as ovens). Further, the distribution apparatus for passing the transmitted infrared radiation into the appliance chamber typically makes use of existing components in the appliance (such as a mode stirrer in a microwave oven, or alternatively other rotating components, such as fans) so as to reduce cost and complexity.

While certain features of the invention have been illustrated and described herein, many modification and changes will occur to those skilled in the art. It is, therefore, to be understood that the appended claims are intended to cover all such modifications and changes as fall within the true spirit of the invention.

What we claim is:

1. A temperature sensing system for providing a non-contact measurement of the temperature of an object disposed in a chamber of an appliance, comprising:

a single infrared radiation source;

a distribution apparatus coupled to said infrared radiation source and disposed to distribute, from one selected location in said chamber, a scan pattern of transmitted infrared radiation into said chamber and receive reflected infrared radiation passing from said chamber;

an infrared radiation detector coupled to said distribution apparatus to detect infrared radiation emanating from said chamber and objects within said chamber; and a processor coupled to said infrared radiation detector, said processor being responsive to the detected infrared radiation so as to generate a calibrated temperature signal for said object;

wherein said processor is configured to generate the calibrated temperature signal with correlation of detected reflections of said scan pattern of transmitted infrared radiation.

2. The system in accordance with claim 1 wherein said distribution apparatus is configured such that said scan pattern of transmitted infrared radiation includes portions of said chamber in which the infrared radiation is distributed to portions of said chamber not occupied by the object disposed in said chamber.

3. The system of claim 2 in which said processor is configured such that the correlation of detected reflection of said scan pattern relates detected return pulse data for portions of said chamber not occupied by the object disposed in said chamber with historical data for said portions of the chamber to provide a calibration factor for determining said calibration temperature.

4. The system of claim 1 wherein said appliance comprises an apparatus selected from the group consisting of refrigerators, convection ovens, microwave ovens, clothes dryers, and clothes washers.

5. A microwave oven having a non-contact temperature sensing system for a microwave oven for determining the temperature of an object disposed within a chamber of the microwave oven, the temperature monitoring system comprising:

a single infrared radiation source;

a distribution apparatus coupled to said radiation source and to said chamber, the distribution apparatus comprising at least one waveguide and a means for distributing, from one selected location in said chamber, infrared radiation received from said waveguide in a scan pattern in said chamber;

an infrared radiation detector coupled to said distribution apparatus to detect infrared radiation emanating from said chamber and objects in said chamber; and a processor coupled to said infrared radiation detector, said processor being responsive to the detected infrared radiation so as to generate a calibrated temperature signal for said object;

wherein said processor is configured to generate the calibrated temperature signal with correlation of detected reflections of said scan pattern of transmitted infrared radiation.

6. The oven of claim 5 wherein said processor comprises an ambient temperature compensation circuit.

7. The oven of claim 6 wherein said means for distributing infrared radiation from said waveguide comprises a rotatable surface disposed to deflect infrared radiation transmitted from said infrared radiation source into said chamber so as to distribute said transmitted infrared radiation in said scan pattern.

8. The oven of claim 7 wherein said scan pattern is distributed over sidewalls and a floor of said chamber.

9. The oven of claim 7 wherein said rotatable surface disposed to deflect infrared radiation comprises a fan disc, said fan disc further being disposed to distribute microwaves into said chamber.

10. The oven of claim 5 wherein said at least one waveguide comprises optical fiber.

11. The oven of claim 5 wherein said infrared radiation source comprises a light emitting diode.

12. The oven of claim 11 wherein said light emitting diode is coupled to said processor so as to generate infrared radiation in response to a signal from said processor.

13. The oven of claim 12 wherein said processor and said infrared radiation source are adapted to generate a train of infrared pulses, each of said pulses having a predefined amplitude, and said infrared detector receives reflections of said pulses from said chamber.

14. The oven of claim 13 wherein said processor is further adapted to process the infrared radiation detected by said infrared detector and generate a temperature signal representative of the temperature of an object in said chamber as a function of amplitude variances between the detected reflected pulses.

15. The oven of claim 14 wherein said processor is further adapted to periodically cause said infrared radiation source to generate infrared transmissions and detected infrared radiation received by said infrared detector is processed within said processor to calibrate emissivity parameters for said chamber.

16. The oven of claim 5 wherein said infrared detector comprises a photodiode.

17. The oven of claim 5 wherein said distribution apparatus further comprises a lens coupled to said means for distributing the transmitted infrared radiation.

18. A non-contact method of generating a temperature measurement for an object disposed within the chamber of an appliance, the method comprising the steps of:

generating infrared transmissions with a single infrared source;

distributing, from one selected location in said chamber said infrared transmission into the appliance chamber in a scan pattern;

detecting infrared radiation emanating from said appliance chamber; and processing signals representative of the detected infrared radiation emanating from said appliance chamber to generate a calibrated temperature signal that corresponds to the temperature of an object disposed in said appliance chamber;

wherein said processing generates the calibrated temperature signal with correlation of detected reflections of said scan pattern of transmitted infrared radiation.

19. The method of claim 18 wherein the step of distributing said infrared radiation in a scan pattern comprises the step of deflecting transmitted infrared radiation pulses so as to distribute said pulses across the sidewalls and floor of said chamber.

20. The method of claim 18 wherein the step of processing signals to generate a calibrated temperature signal comprises the steps of correlating amplitudes of a plurality of detected reflected infrared pulses with an amplitude of corresponding transmitter pulses and with respective ones of the detected reflected pulses so as to determine emissivity parameters of objects disposed within said chamber.

21. The method of claim 20 further comprising the step of compensating said calibrated temperature signal for ambient temperature conditions around said infrared detector.

22. The method of claim 18 wherein said appliance is selected from the group consisting of refrigerators, convection ovens, microwave ovens, clothes dryers, and clothes washers.

* * * * *